2,793,197
Patented May 21, 1957

2,793,197

FOOD RELEASE COMPOSITION CONSISTING OF TWO INCOMPATABLE ORGANOPOLYSILOXANES

Donald V. Brown, Schenectady, N. Y., assignor to General Electric Company, a corporation of New York No Drawing. Application January 10, 1956,
Serial No. 560,272

7 Claims. (Cl. 260—33.8)

This invention is concerned with compositions of matter useful for releasing foods. More particularly, the invention is concerned with a composition of matter useful in releasing goods which are baked, cooked, etc., at elevated temperatures in various types of receptacles, said composition of matter comprising, by weight, (1) from 0.3 to 3 parts of a non-heat-curable organopolysiloxane with viscosity above 1,000,000 centistokes when measured at about 38° C. in which at least 90% of the silicon-bonded organic groups are lower alkyl radicals selected from the class consisting of methyl and ethyl radicals, and mixtures of such radicals, the remainder, if any, of the silicon-bonded organic radicals being selected from the class consisting of methyl, ethyl, phenyl, chlorophenyl, and vinyl radicals, and mixtures of such radicals, there being present on the average of from about 1.98 to 2.05 total organic radicals per silicon atom, (2) one part of a methyl phenylpolysiloxane fluid incompatible with (1) and containing from 2.001 to 2.25 total methyl and phenyl radicals per silicon atom, the methyl phenylpolysiloxane fluid (hereinafter identified as "methyl phenyl fluid") having a viscosity of from 50 to 100,000 centistokes when measured at about 38° C. and being chain-stopped with trimethylsiloxy units and containing dimethylsiloxy units and organosiloxy units selected from the class consisting of $(C_6H_5)_2SiO$ units and $(CH_3)(C_6H_5)SiO$ units, and mixtures of the aforesaid two units, and (3) a volatile liquid carrier for (1) and (2).

The term "incompatible" employed in the specification and claims is intended to mean the following: When the high viscosity, non-heat-curable organopolysiloxane is mechanically and intimately mixed in a vigorous manner with the methyl phenylpolysiloxane fluid, and the mixture allowed to stand for at least 24 hours, a two-phase separation will occur, one phase being the high viscosity organopolysiloxane and the other phase being the methyl phenylpolysiloxane fluid.

In the cooking and baking of various foods, such as the cooking of oatmeal, cornmeal, macaroni, frying of eggs, etc., and in the baking of various cakes, pies, bread, cookies, waffles, etc., it has been the custom in the past to use various lubricating materials of either vegetable or animal derivation. Thus, materials such as lard, other fats originating with animals, vegetable shortening such as Crisco, etc., have been employed to coat receptacles, particularly those used for baking purposes. In connection with the cooking of various foods, particularly the above-mentioned cereals, so far as is known, no satisfactorily successful method has been devised for treating the cooking vessel on the inside with a lubricating material to prevent sticking of the food being cooked therein. As is well known, particularly to housewives, by cooking such materials as cereals, high sugar-content and high starch-content materials, as well as when baking various foods including cakes, bread, etc., it is often difficult to prevent undesirable adhesion of the food to the inside of the cooking or baking vessel, so that when it comes time to either remove the food from the receptacle or else to clean the receptacle itself after use, it is difficult to remove the particles or portions of the food which adhere, often quite tenaciously, to the surface of the cooking or baking receptacle.

U. S. Patent 2,606,510 is concerned with the use of heat-hardened organopolysiloxane resins on cooking implements to prevent sticking of the food which may be cooked or baked therein. One of the difficulties of using the compositions described in this patent, particularly by the housewife, is the necessity, in order to obtain maximum release characteristics, of heat-treating the pan coated with the organopolysiloxane resin for a time sufficient to effect heat-hardening and curing of the organopolysiloxane resin. Usually, the housewife does not have facilities for such heat treatment and, furthermore, after use of the pan for cooking or baking purposes, the release characteristics of the film applied to the cooking utensil diminish after a certain number of releases and must be recoated with the organopolysiloxane resin. This, of course, poses the serious problem of removing the old film from the cooking utensil, and this is often extremely difficult and requires special chemicals and chemical equipment. Accordingly, such organopolysiloxane resins have found little use in the home for preventing the sticking of foods.

Unexpectedly, I have discovered that I am able to coat pans or other cooking or baking utensils with a special type of organopolysiloxane composition, and that the coating thus applied need not be heat-treated prior to use in order to obtain the maximum release characteristics. Moreover, the organopolysiloxane film thus applied in accordance with the practice of my invention, in addition to giving repeated releases even under extreme conditions of use, such as occurs when charring or burning of foods takes place, after use can be readily removed by means available in the home, for instance, by the use of steel wool soap pads, and often by mere application of a cloth with soap or detergent and water.

It is therefore one of the objects of this invention to obtain ready and repeated release of foods cooked or baked in various utensils by means of organopolysiloxane compositions which do not require any prior heat-hardening treatment.

It is another object of the invention to be able to cook or bake foods in various receptacles without the requirement of using any previously known shortenings or lubricating materials, and that the release thus obtained is substantially complete even under conditions where charring or burning has taken place.

It is a still further object of the invention to obtain release of foods by means of organopolysiloxane compositions which can be readily applied to pans and which, after use, can be readily removed without any specialized techniques or equipment or chemicals.

Other objects of the invention will become more apparent from the discussion which follows.

All of the above objectives are attained by employing as the coating for the cooking or baking or other utensil a composition of matter comprising, by weight, (1) from 0.3 to 3 parts of an organopolysiloxane having a viscosity above one million centistokes (and as high as 20,000,000 or more centistokes) when measured at about 38° C. in which at least 90% of the silicon-bonded organic groups are lower alkyl radicals selected from the class consisting of methyl and ethyl radicals, and mixtures of such radicals, the remainder, if any, of the silicon-bonded organic radicals being selected from the class consisting of methyl, ethyl, phenyl, chlorophenyl and vinyl radicals, and mixtures of such radicals, there being present on the average from about 1.98 to 2.05 total organic radicals per silicon atom, (2) one part of a methyl phenylpolysiloxane fluid having a viscosity of from 50 to 100,000 centistokes when measured at 38° C. and being incompatible with the high viscosity organopolysiloxane and containing from 2.001 to 2.25 total methyl and phenyl radicals per silicon atom, the methyl phenyl fluid being chain-stopped with trimethyl siloxy groups and containing dimethylsiloxy units and organosiloxy units selected from the class consisting of $(C_6H_5)_2SiO$ units, $(CH_3)(C_6H_5)SiO$ units, and mixtures of the aforesaid two units, and (3) a volatile liquid carried for (1) and (2). Both the organopolysiloxanes can be heated for long periods of time without significantly affecting the viscosity of the organopolysiloxanes at room temperature.

From the above description of the material used in the coating of the cooking and baking receptacles, it will be noted that it is essential that an extremely high viscosity material be used in combination with an organopolysiloxane fluid of lower viscosity which is incompatible with the high viscosity organopolysiloxane. In addition, it has also been found critical that the incompatible fluid be composed of both methyl and phenyl radicals. Preferably, the molar concentration of phenyl groups in the methyl phenyl fluid is from about 25 to 65 mol percent. It was unexpectedly found that if one employs for coating purposes a methylpolysiloxane fluid alone in which the fluid consists essentially of silicon-bonded methyl groups as, for instance, those described in U. S. 2,462,242, there being no phenyl groups present, the release characteristics were markedly inferior to those of the compositions embraced within the scope of the present invention. Moreover, if compatible mixtures of (1) and (2) were employed, again there was no release of foods which may have been tested by cooking or baking under conditions which will be described hereinafter. In addition, it was found that the use of, for instance, a pure methyl phenyl fluid of the type described in (2) above, without the accompanying incompatible high viscosity organopolysiloxane, gave poor release and, in many instances, there was no release at all of foods which were cooked to a charred condition.

The use of uncured resins alone as described in the above-mentioned Collings patent in the manner in which my compositions of matter are employed gave no release characteristic, and merely gave a smeary coating which was readily fouled by the cooking or baking of foods.

The high viscosity organopolysiloxanes employed in the practice of the present invention, which may have viscosities of from about one million to twenty million or more centistokes when measured at 38° C., are more particularly described in such patents as Warrick Patent 2,460,795, Marsden Patent 2,521,528, and Warrick Patent 2,541,137. In general, these high viscosity materials may be obtained by hydrolyzing a diorganodihydrolyzable silane or mixtures of diorganodihydrolyzable silanes, for instance, dimethyldichlorosilane, diethyldichlorosilane, methyl ethyldiethoxysilane, mixtures of dimethyldichlorosilane and diphenyldichlorosilane, mixtures of dimethyldichlorosilane and methyl phenyldichlorosilane, mixtures of dimethyldichlorosilane and vinyl methyl dichlorosilane, etc., keeping in mind that at least 90% of the organic groups are lower alkyd groups, and thereafter separating the hydrolysis product which generally comprises mixtures of cyclic polymers of the formula $(RRSiO)_m$, where R is a member of the class consisting of methyl, ethyl, phenyl, chlorophenyl (e. g., dichlorophenyl, tetrachlorophenyl, etc.), and vinyl radicals, making sure that at least 90% of the silicon-bonded organic groups are lower alkyl radicals, such as methyl and ethyl radicals, and $m$ is an integer equal to at least 3, for instance, from 3 to 12 or more. These mixtures of cyclic polymers, which also may contain long chain diorganosiloxy polymers containing terminal hydroxyl groups, may be intercondensed to the high viscosity materials by the use of various condensing agents, such as alkali-metal hydroxides (e. g., potassium hydroxide, cesium hydroxide, etc.), acidic condensing agents such as ferric chloride, hydrochloric acid, sulfuric acid, etc. Alternatively, one may obtain by methods known in the art individual cyclic polymers such as octamethylcyclotetrasiloxane, octaethylcyclotetrasiloxane, mixtures of octamethylcyclotetrasiloxane, and octaethylcyclotetrasiloxane, mixtures of hexamethylcyclotrisiloxane and octamethyltetrasiloxane, mixtures of octamethylcyclotetrasiloxane and octaphenylcyclotetrasiloxane, mixtures of octamethylcyclotetrasiloxane and tetramethyl tetraphenyl, tetrasiloxane, etc. (the presence of some silicon-bonded vinyl groups not being precluded), and thereafter condensing these materials with the above-mentioned condensing agents, especially alkaline condensing agents such as potassium hydroxide, at a temperature of from about 125 to 175° C. for times varying from about 15 minutes to 2 hours or more, employing concentrations of from about 0.001 to about 0.1%, by weight, of the condensing agent, until a highly viscous, bordering on a gummy solid, product is obtained which has slight flow at room temperature and may have viscosities of above one million centistokes, as described above. In general, these materials (which may have interconected triorganosiloxy units, for instance, trimethylsiloxy units for control purposes) contain about 1.98, preferably from 1.999, to 2.001 total organic radicals per silicon atom, where at least 90% of the silicon atoms in the polysiloxane contain two silicon-bonded lower alkyl radicals, for instance, methyl or ethyl radicals. These high viscosity organopolysiloxanes comprise organic substituents consisting essentially of the above-mentioned monovalent organic radicals attached to silicon through carbon-silicon linkages and in which the repetitive siloxane units consist of units of the structural formula

where R has the meaning given above. The presence of concentrations of less than 1 mol percent of siloxy units, such as monoorganosiloxy units, e. g., monomethylsiloxy units of the formula

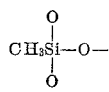

for modifying purposes is not precluded.

The incompatible methyl phenyl fluid advantageously has the general formula $R_{(2a+2)}Si_aO_{(a-1)}$, in which R is a member selected from the class consisting of methyl and phenyl radicals, $a$ is a whole number and is equal to at least 3, there being present from about 2.001 to 2.25 total methyl phenyl radicals per silicon atom, and of the total number of methyl and phenyl radicals, the phenyl radicals preferably comprise from 25 to 65 mol percent of the total number of silicon-bonded organic radicals. As pointed out above, the phenyl radicals may be present as diphenylsiloxy units or methyl phenyl siloxy units. Specific examples of compositions which this incompatible methyl phenyl fluid may comprise are those having the formula I 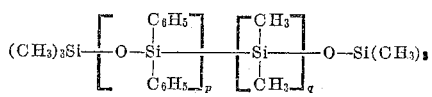

where $p$ and $q$ are integers equal to at least 1, and are so employed that the number of methyl groups comprises from 35 to 75 mol percent of the total number of methyl and phenyl groups. Alternatively, in place of the diphenylsiloxy units in the above-identified Formula I, one may also have methyl phenylsiloxy units of the formula $(CH_3)(C_6H_5)SiO$, or such methyl phenylsiloxy units may be in combination with the diphenyl siloxy units intercondensed with the dimethyl siloxy units. The presence of small molar concentrations of additional intercondensed trimethylsiloxy units other than the chain-stopping trimethylsiloxy units, or monomethylsiloxy units, is not precluded, as long as the methyl phenylpolysiloxane fluid fulfills the essential requirement that it be incompatible with the high viscosity organopolysiloxane. More specific examples of such fluids, as well as methods for making such fluids, may be found described in Patnode Patent 2,469,888 issued May 10, 1949, and assigned to the same assignee as the present application.

The volatile liquid carrier for the high viscosity organopolysiloxane and the methyl phenylpolysiloxane fluid is preferably one which is a solvent for both of the former two organopolysiloxanes, and is a volatile material free of offensive odors and of deleterious effect on the cooking utensils, and which readily volatilizes either upon application of solutions of the treating composition or else by a slight warming, for instance, at the time that cooking or baking is carried out. Among such solvents may be mentioned mineral spirits, acetone, chlorinated hydrocarbons (e. g., trichloroethylene, ethylene dichloride, etc.), ethers, etc. Solutions may be made of the high viscosity organopolysiloxane, the incompatible methyl phenyl fluid, and of the solvent, and these may be applied to the baking or cooking pan by spraying or by brushing, employing organopolysiloxane solids contents in the solution ranging from about 0.1 to about 5% or more, by weight, of the total solution.

A carrier which I have found to be exceptionally convenient because of the fact that it can be employed with the release compositions described above in combination with aerosol bombs under pressure, are the Freons. These materials are propellants or liquefied gas which normally have a vapor pressure at 70° F. exceeding 20 lb./sq. in. gauge, and which are able to induce the expulsion of the mixture of the high viscosity organopolysiloxane and methyl phenylpolysiloxane fluid in extremely small average particle size, preferably within the range of from about 10 to 100 microns. These propellants (which are also sold under the name of "Genetrons") are non-toxic, have a high flash point, and are non-inflammable. In general, they are chlorinated fluorinated alkanes, examples of which are dichlorodifluoromethane, dichlorofluoromethane, chlorodifluoromethane, trichloromonofluoromethane, difluorodichloroethane, etc. Obviously, mixtures of these chlorinated fluorinated alkanes may also be employed to advantage. More particular directions or examples for using these Freon propellants are found in the booklet issued by E. I. du Pont de Nemours and Company, Wilmington, Delaware, entitled "Package for Profit."

The proportion of the high viscosity organopolysiloxane and the methyl phenyl incompatible fluid may be varied within certain limits and is preferably employed on a weight basis from 0.3 to 3 parts of the high viscosity organopolysiloxane per part of the methyl phenyl fluid. A range of ingredients which may advantageously be employed using the above mixture with the above-identified fluorinated hydrocarbons is one having the formulation

| Ingredient | Parts by Weight |
|---|---|
| High viscosity organopolysiloxane | 0.3 to 3 |
| Methyl phenylpolysiloxane fluid | 1 |
| Fluorinated hydrocarbon propellant | 50 to 200 |

The concentration of the mixture of organopolysiloxanes in other solvents may be varied as high as 10%, by weight, of the solution.

I have unexpectedly discovered that still further improvements in release characteristics and especially in the number of successive releases can be obtained by employing in combination with the above-described mixture of ingredients small amounts of metallic salts of organic acids. Among the salts which may be advantageously employed are, for instance, tin salts, iron salts, zinc salts, magnesium salts, etc. The organic acids are generally of the fatty acid series, as, for instance, acetates, propionates, butyrates, laurates, octoates, naphthenates, etc. The amount of these metallic salts expressed as the metal itself is generally within the range of from about 0.5 to 5%, by weight, based on the total weight of the high viscosity organopolysiloxane and the incompatible methyl phenyl fluid. One of the important requirements of the metallic salt used is that it be soluble in the liquid carried for the organopolysiloxane ingredients. The use of these metallic salts gives more complete and more consistent release, although without the metallic salt, greatly improved results are obtained over those obtained with heretofore known release agents in cooking and baking.

In order that those skilled in the art may better understand how the present invention may be practiced, the following examples are given by way of illustration and not by way of limitation. All parts are by weight.

In the following examples, the cooking tests were conducted with two cereals, oatmeal and cornmeal, which were mixed in a ratio, by weight, of one part cereal to two parts water. This mixture was then placed in an aluminum pan which had been coated with the particular release agent and heated over an open flame for one-half hour until all the water had been volatilized and the portion of cereal closest to the pan surface had been fairly well burned. The test for release characteristics was conducted by turning over the pan while tapping it lightly and determining whether the cereal cake fell out of the pan readily. After the pan was freed of the cooked cereal, the percent of cooking area in the pan to which the burned cereal adhered was determined. Although this evaluation is not too precise, nevertheless continued testing and experience by means of this test proved to be fairly accurate as a measure of the release characteristics of the various coatings for the pans tested.

The baking test was carried out by baking various prepared cake mixes in a coated pan, which was an 8-inch round aluminum pan. The baking was carried out at about 177° C. for 25 to 35 minutes. Thereafter, the pan was inverted and tapped once on a hard surface. A 100% release meant that the cake came out clean without leaving any residue stuck on the inside surface. Percents less than 100% indicated the area percent of the pan free of adhering cake.

EXAMPLE 1

A high viscosity methyl polysiloxane was prepared by heating octamethylcyclotetrasiloxane for about three hours at about 150° C. with about 0.01% KOH based on the weight of the octamethylcyclotetrasiloxane. There was thus obtained a high viscosity methylpolysiloxane consisting essentially of recurring dimethylsiloxy units. The viscosity of the polydimethylsiloxane was of about 4 to 6 million centistokes when measured at 38° C. The material was identified as "methylpolysiloxane."

EXAMPLE 2

A non-heat-curable methyl phenyl non-resinous polysiloxane fluid incompatible with the methyl polysiloxane of Example 1 was prepared by heating at reflux temperature of about 130° C. for 30 hours a mixture of ingredients composed of 198 parts octaphenylcyclotetrasiloxane, 74 parts octamethylcyclotetrasiloxane, 30 parts hexamethyldisiloxane, and 0.5 part KOH. At the end of this time, there was obtained a fluid chain-stopped methyl phenylpolysiloxane of the general formula

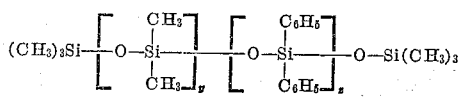

where $y$ and $z$ are integers of at least 1, it being understood that the positions of the dimethylsiloxy and diphenylsiloxy units are of a random nature and that it may be possible in the molecules of the methyl phenyl fluid that each of the trimethylsiloxy units may have attached thereto a dimethylsiloxy unit and that the other dimethylsiloxy units and diphenylsiloxy units are intermediate the terminally attached dimethylsiloxy units; another possible configuration is where diphenylsiloxy units are attached to the terminal trimethylsiloxy units, or one dimethylsiloxy unit and one diphenylsiloxy unit is attached to the terminal trimethylsiloxy units. The product thus obtained was distilled to remove low molecular weight products boiling below about 130° C., to give a methyl phenyl fluid (hereinafter so designated) having a viscosity of 10,000 centistokes when measured at 38° C. This material contained 50 mol percent phenyl groups.

EXAMPLE 3

A methyl phenyl resin having a ratio of 1.4 total methyl and phenyl groups per silicon atom and containing about 60 mol percent phenyl groups was prepared by cohydrolyzing 20 mol percent methyltrichlorosilane, 40 mol percent phenyltrichlorosilane, 20 mol percent diphenyldichlorosilane, and 20 mol percent dimethyldichlorosilane. This resinous material was washed several times with water and neutralized, and dissolved in an aromatic hydrocarbon solvent to a solids content of about 60% solids. This material was identified as "methyl phenylpolysiloxane resin."

EXAMPLE 4

A trimethylsiloxy chain-stopped straight methyl polysiloxane fluid was prepared by coreacting octamethylcyclotetrasiloxane and hexamethyldisiloxane to give a linear trimethylsiloxy chain-stopped methyl polysiloxane more particularly described in Patnode Patent 2,469,890 and having a viscosity of about 1000 centistokes.

EXAMPLE 5

Formulations employing the organopolysiloxane prepared in Examples 1 to 4 were prepared by mixing these materials or mixtures of these compositions with a propellent composed of Freon 11 (trichlorofluoromethane) and Freon 12 (dichlorodifluoromethane) in such proportions that the organopolysiloxane constituent composed about 2.25 to 3 parts of the latter per 120 parts of the mixture of Freons which were present in equal parts, by weight. In some of these formulations, the metallic salt of an organic acid, specifically tin octoate (stannous octoate) was added in an amount equal to about 2% tin as tin octoate, based on the weight of the organopolysiloxanes in the Freon solution. Following are the formulations used in the subsequently described cooking and baking tests:

*Formulation number (parts by weight)*

| Ingredient | 1 | 2 | 3 | 4 | 5 | 6 | 7 |
|---|---|---|---|---|---|---|---|
| High viscosity methylpolysiloxane | 3 | | | 1.5 | 1.5 | 1.5 | 1.5 |
| Methyl phenylpolysiloxane fluid | | 3 | | | a 1.5 | 1.5 | b 1.5 |
| Methyl polysiloxane oil (10,000 centistokes) | | | 3 | | | | |
| Methyl phenyl polysiloxane resins | | | | 0.75 | | | |
| Stannous octoate as a 14% solution | | | | | 0.5 | | 0.5 |
| Freon 11 and Freon 12 | 120 | 120 | 120 | 120 | 120 | 120 | 120 | a 40 mol percent phenyl groups.
b 50 mol percent phenyl groups.

Each of the above formulations was placed in a pressure vessel having a valve nozzle. The valve was opened for one or more seconds to produce a burst of propellant and release agent in the form of a fine floating mist having an average particle size not exceeding approximately 50 microns. The mist was allowed to impinge upon the surfaces of various cooking and baking pans of aluminum (no particular cleaning techniques are required before application of the film), the propellant evaporating almost immediately after leaving the vessel, imparting a thin continuous film of the release agent on the surface of the pan. Oatmeal and cornmeal were cooked in each of the pans in accordance with the directions previously given until the cereal had been evaporated to dryness, and charring of the cereal began to occur. This usually took about one-half hour. Thereafter, the pan was tipped over and tapped on a hard surface to determine whether the cooked cake came out readily. As a result of this test, it was found that the pans coated with Formulations 1 to 4, inclusive, failed to release the cooked cake with one tap. After several hard taps, the only cereal cake which came out after such treatment was the one cooked in the pan coated with Formulation 4, and this showed some degree of sticking of the cereal to the pan of the order of about 20 percent of the area of the cooking surface of the pan. The pans employing as the release agent Formulations 5, 6 and 7 readily fell out on the initial tapping to give an essentially clean surface, indicating 100% release.

In addition to the above tests, various types of prepared cake mixes, such as gingerbread cake mix, chocolate cake mix, etc., were baked in aluminum pans in the manner described above. As a control, one pan was coated with Crisco. After the baking cycle, each pan again was tipped over and it was determined which of the formulations released the cake merely on turning over the pan without tapping. It was found that the baking pans coated with Formulation 5 showed that after 54 separate trials, the release was essentially 100% perfect as far as clean area of the pan was concerned. The pan coated with Formulation 6 also showed good release characteristics and the percent release was well above the 80% minimum release which was required if it was to be considered satisfactory. The pan coated with Formulation 7 showed repeated releases (about 10 successive times) of between 90 and 100% clean area in the pan. In contrast to this, the pans coated with either the Crisco or with Formulations 1 to 4, either failed to release even though strenuous efforts were made to release the cake by tapping repeatedly, or else when the cake was released, large areas of the cake surface ranging from 50 to 100% of the pan area were left behind adhering to the pan.

It will, of course, be understood by those skilled in the art that in addition to the high viscosity organopolysiloxane and non-resinous, fluid methyl phenylpolysiloxane used in the prior examples, other high viscosity organopolysiloxanes of different viscosities and composed of different organic groups, as well as other methyl phenylpolysiloxanes of different phenyl concentration, may be employed without departing from the scope of the invention. Also, it will be obvious that the proportions of the ingredients can be varied within the limits described previously, without departing from the scope of the invention. The metallic salt can be varied in concentration or in composition, and other metallic salts, such as zinc naphthenate, iron octoate, etc., may be used. It is also intended within the scope of the invention to employ other carrying agents, many examples of which have been given above, in place of the Freons used in the foregoing examples.

As will be readily seen, my invention has great utility in decreasing and eliminating the tendency of various foods (particularly sugar-containing foods, which as far as is known, have not previously been successfully released) to adhere to pans in which they may be cooked or baked. The method of application of the release agents used in the practice of the present invention is relatively simple and requires no special equipment, and once applied the release film can readily be removed as evidenced by the fact that any one of the baking or cooking pans described in the foregoing examples could be washed with soap and water or with a soaped steel wool pad such as Brillo to completely remove the film of organopolysiloxane present on the pan. The compositions of my invention adapt themselves quite readily to aerosol bomb packaging, so that ready use can be made of these release agents by means of being propelled by propellants under pressure in convenient pressure receptacles.

It will also be apparent to those skilled in the art that one may employ with my claimed release agents other modifying agents which are inert or will not deleteriously affect the properties of the film deposited, such as, for instance, pigments, dyes, small amounts of filler, such as finely divided silica fillers, etc., which are not toxic in the concentrations employed, without departing from the scope of the invention.

What I claim as new and desire to secure by Letters Patent of the United States is:

1. A composition of matter comprising, by weight, (1) from 0.3 to 3 parts of a non-resinous organopolysiloxane of viscosity above one million centistokes when measured at about 38° C. in which at least 90% of the silicon-bonded organic groups are lower alkyl radicals selected from the class consisting of methyl and ethyl radicals and mixtures of such radicals, the remaining silicon-bonded organic radicals being selected from the class consisting of methyl, ethyl, phenyl, chlorophenyl, and vinyl radicals, and mixtures of such radicals, there being present on the average of from about 1.98 to 2.05 total organic radicals per silicon atom, (2) one part of a non-resinous, non-heat-curable methyl phenylpolysiloxane fluid of from 50 to 100,000 centistokes viscosity when measured at 38° C. and being incompatible with (1) and containing from 2.001 to 2.25 total methyl and phenyl radicals per silicon atom, the methyl phenyl fluid being chain-stopped with trimethyl siloxy groups and containing dimethylsiloxy units and organosiloxy units selected from the class consisting of $(C_6H_5)_2SiO$ units, $(CH_3)(C_6H_5)SiO$ units, and mixtures of the aforesaid two units, and (3) a volatile organic liquid carrier for (1) and (2).

2. A composition as in claim 1 in which the volatile liquid carrier is a volatile, non-toxic fluorinated alkane of from 1 to 2 carbon atoms.

3. A composition of matter comprising, by weight, (1) from 0.3 to 3 parts of a non-resinous organopolysiloxane of viscosity above one million centistokes when measured at about 38° C. in which at least 90% of the silicon-bonded organic groups are lower alkyl radicals selected from the class consisting of methyl and ethyl radicals and mixtures of such radicals, the remaining silicon-bonded organic radicals being selected from the class consisting of methyl, ethyl, phenyl, chlorophenyl, and vinyl radicals, and mixtures of such radicals, there being present on the average of from about 1.98 to 2.05 total organic radicals per silicon atom, (2) one part of a non-resinous, non-heat-curable methyl phenylpolysiloxane fluid of from 50 to 100,000 centistokes viscosity when measured at 38° C. and being incompatible with (1) and containing from 2.001 to 2.25 total methyl and phenyl radicals per silicon atom, the methyl phenyl fluid being chain-stopped with trimethyl siloxy groups and containing dimethylsiloxy units and organosiloxy units selected from the class consisting of $(C_6H_5)_2SiO$ units, $(CH_3)(C_6H_5)SiO$ units, and mixtures of the aforesaid two units, the methyl phenyl fluid containing from 25 to 65 mol percent phenyl groups, and (3) a volatile organic liquid carrier for (1) and (2).

4. A composition of matter comprising, by weight, (1) from 0.3 to 3 parts of a non-resinous organopolysiloxane of viscosity above one million centistokes when measured at about 38° C. in which at least 90% of the silicon-bonded organic groups are lower alkyl radicals selected from the class consisting of methyl and ethyl radicals and mixtures of such radicals, the remaining silicon-bonded organic radicals being selected from the class consisting of methyl, ethyl, phenyl, chlorophenyl, and vinyl radicals, and mixtures of such radicals, there being present on the average of from about 1.98 to 2.05 total organic radicals per silicon atom, (2) one part of a non-resinous, non-heat-curable methyl phenylpolysiloxane fluid of from 50 to 100,000 centistokes viscosity when measured at 38° C. and being incompatible with (1) and containing from 2.001 to 2.25 total methyl and phenyl radicals per silicon atom, the methyl phenyl fluid being chain-stopped with trimethyl siloxy groups and containing dimethylsiloxy units and organosiloxy units selected from the class consisting of $(C_6H_5)_2SiO$ units, $(CH_3)(C_6H_5)SiO$ units, and mixtures of the aforesaid two units, (3) a volatile organic liquid carrier for (1) and (2), and (4) from 0.5 to 5 percent, by weight, based on the combined weight of (1) and (2), of a metallic salt of an organic acid, the metallic ion of the organic acid being selected from the class consisting of tin, iron, zinc and magnesium.

5. A composition of matter comprising, by weight, (1) from 0.3 to 3 parts of a non-resinous methylpolysiloxane of viscosity above one million centistokes when measured at about 38° C., there being present on the average of from about 1.98 to 2.05 methyl radicals per silicon atom, (2) one part of a non-resinous, non-heat-curable methyl phenylpolysiloxane fluid of from 50 to 100,000 centistokes viscosity when measured at 38° C. and being incompatible with (1) and containing from 2.001 to 2.25 total methyl and phenyl radicals per silicon atom, the methyl phenyl fluid being chain-stopped with trimethyl siloxy groups and containing dimethylsiloxy units and organosiloxy units selected from the class consisting of $(C_6H_5)_2SiO$ units, $(CH_3)(C_6H_5)SiO$ units, and mixtures of the aforesaid two units, and (3) a volatile organic liquid carrier for (1) and (2).

6. A composition of matter comprising, by weight, (1) from 0.3 to 3 parts of a non-resinous methylpolysiloxane of viscosity above one million centistokes when measured at 38° C., there being present on the average of from about 1.98 to 2.05 methyl radicals per silicon atom, (2) one part of a non-resinous, non-heat-curable methyl phenylpolysiloxane fluid of from 50 to 100,000 centistokes viscosity when measured at 38° C. and being incompatible with (1) and containing from 2.001 to 2.25 total methyl and phenyl radicals per silicon atom, the methyl phenyl fluid being chain-stopped with trimethyl siloxy groups and containing dimethylsiloxy units and organosiloxy units selected from the class consisting of $(C_6H_5)_2SiO$ units, $(CH_3)(C_6H_5)SiO$ units, and mixtures of the aforesaid two units, (3) a volatile organic liquid carrier for (1) and (2), and (4) a metallic salt of an organic acid, the metallic ion of the organic acid being selected from the class consisting of tin, iron, zinc and magnesium.

7. A composition of matter comprising, by weight, (1) from 0.3 to 3 parts of a non-resinous methylpolysiloxane of viscosity above one million centistokes when measured at 38° C., there being present on the average of from about 1.98 to 2.05 methyl radicals per silicon atom, (2) one part of a non-resinous, non-heat-curable methyl phenylpolysiloxane fluid of from 50 to 100,000 centistokes viscosity when measured at 38° C. and being incompatible with (1) and containing from 2.001 to 2.25 total methyl and phenyl radicals per silicon atom, the methyl phenyl fluid being chain-stopped with trimethyl siloxy groups and containing dimethylsiloxy and diphenylsiloxy units, (3) from 0.5 to 5 percent, by weight, based on the combined weight of (1) and (2) of stannous octoate, and (4) a propellent and solvent medium comprising a mixture of fluorinated methanes.

No references cited.